United States Patent [19]

Yoneda et al.

[11] Patent Number: 4,916,542
[45] Date of Patent: Apr. 10, 1990

[54] PICTURE QUALITY ADJUSTING CIRCUIT WITH FIR FILTER FOR DIGITAL PROCESSING

[75] Inventors: Minoru Yoneda, Yokohama; Akihiko Enomoto, Tokyo; Takashi Koga; Hiroshi Kobata, both of Yokohama, all of Japan

[73] Assignee: Kabushiki Kaisha Toshiba, Kawasaki, Japan

[21] Appl. No.: 313,899

[22] Filed: Feb. 23, 1989

[30] Foreign Application Priority Data

Feb. 29, 1988 [JP] Japan .................................. 63-44261

[51] Int. Cl.⁴ ........................ H04N 5/213; H04N 9/64
[52] U.S. Cl. ........................................ 358/167; 358/36
[58] Field of Search ................. 358/167, 36, 166, 37; 364/724.16

[56] References Cited

U.S. PATENT DOCUMENTS

| | | | |
|---|---|---|---|
| 4,009,334 | 2/1977 | Sypula | 358/36 |
| 4,015,076 | 3/1977 | Ishiodori | 358/167 |
| 4,573,075 | 2/1986 | Bolger | 358/167 |
| 4,691,293 | 9/1987 | Conboy | 364/724.16 |
| 4,695,877 | 9/1987 | Matsumoto | 358/36 |
| 4,709,269 | 11/1987 | Ozaki | 358/36 |
| 4,823,190 | 4/1989 | Yamamoto | 358/166 |

FOREIGN PATENT DOCUMENTS 61-70464 5/1986 Japan .
63-4753 1/1988 Japan .

*Primary Examiner*—John K. Peng
*Attorney, Agent, or Firm*—Cushman, Darby & Cushman

[57] ABSTRACT

A circuit for adjusting a picture quality by processing a digital video signal. A digital filter receives the digital video signal and extracts a high-frequency component therefrom. A first waveform-shaping element wave-shapes the high-frequency component to provide a noise cancel signal for canceling the noise. A second waveform-shaping element wave-shapes the high-frequency component to provide a contour compensation signal for compensating a contour of a picture. An adder adds the digital video signal, the noise cancel signal and the contour compensation signal to provide a signal with adjusted picture quality.

10 Claims, 5 Drawing Sheets

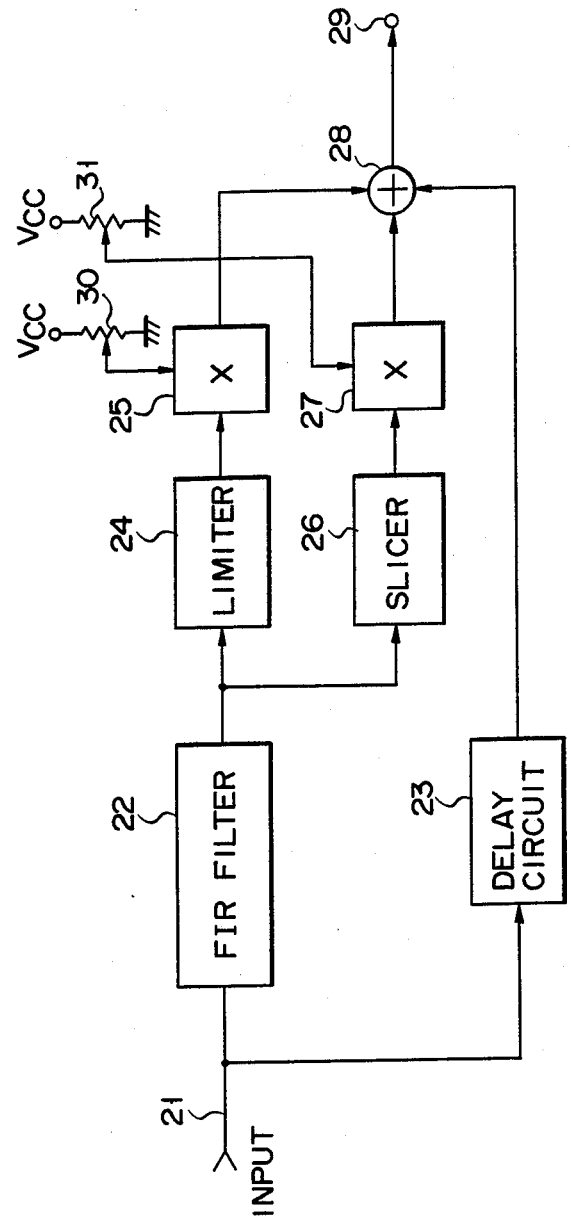
F I G. 1

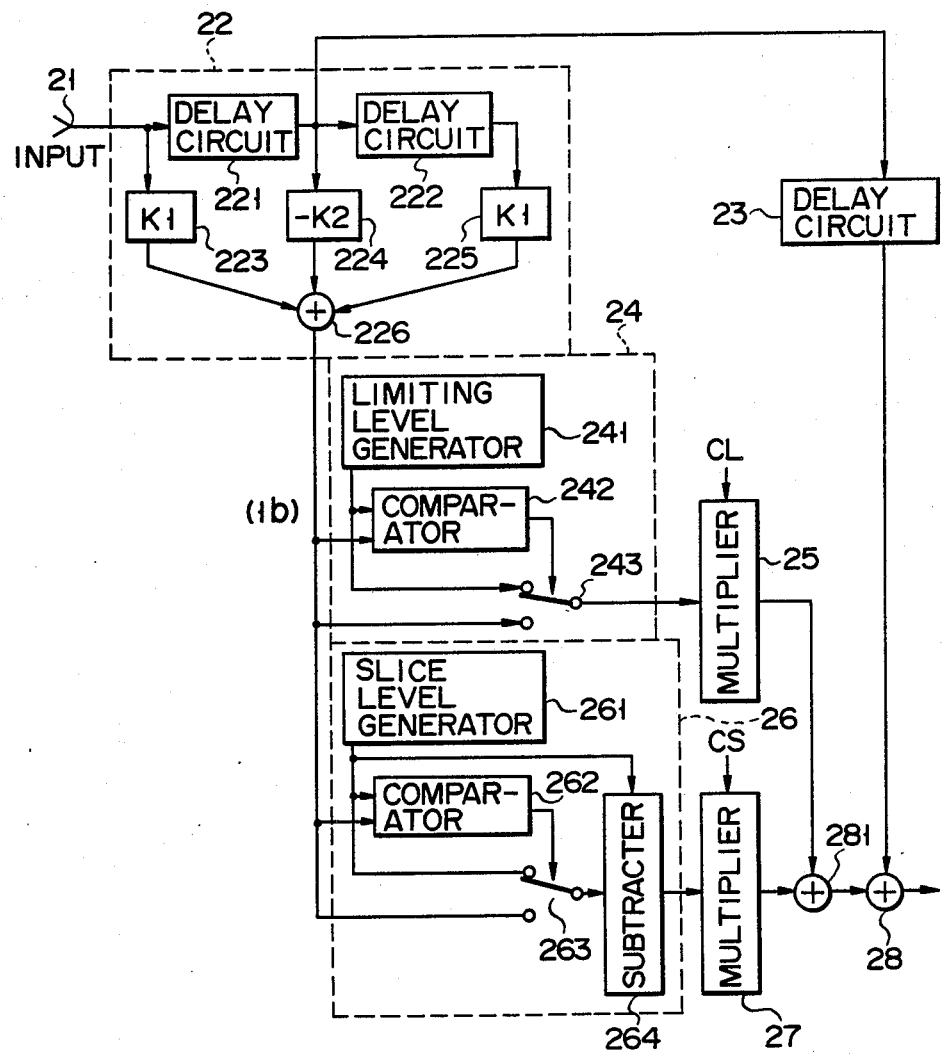
F I G. 6

PICTURE QUALITY ADJUSTING CIRCUIT WITH FIR FILTER FOR DIGITAL PROCESSING

BACKGROUND OF THE INVENTION

1. Field of the Invention

The present invention relates to a picture quality adjusting circuit for use in a video signal processing apparatus, and, more particularly, to a picture quality adjusting circuit which uses a finite impulse response (FIR) filter to realize both contour compensation and noise canceling with a single circuit.

2. Description of the Related Art

A video signal processing apparatus that processes video signals of an NTSC system has a contour compensator and a noise canceling circuit or the like incorporated therein, the former for emphasizing the contour of a video image and the latter for reducing a noise component included in a video signal.

The contour compensator controls the gain of a signal of a frequency around 1 to 2 MHz, most detectible by the vision of human beings, in order to emphasize the contour of a picture. An example of the contour compensator has first and second differentiation circuits for acquiring a secondary differential waveform from an input signal, and a delay circuit for delaying the input signal. The output of the second differential circuit is inverted by an inverter and the inverted signal is added with the delayed input signal, thereby providing a contour-compensated signal.

An example of the noise canceling circuit has a high-pass filter for extracting a high-frequency component from an input signal, a limiter for extracting a noise component by limiting the level of the output of the filter, and a delay circuit for delaying the input signal. The noise component from the limiter is inverted by an inverter, and the resultant signal is added with the delayed input signal, thereby providing a signal with the noise component canceled out.

The aforementioned conventional contour compensator is constituted by an analog circuit. In effect, therefore, the secondary differential waveform acquired from the contour compensator, for example, may include a ringing and the accurate contour compensation cannot be thus performed. Since the contour compensation is performed only on a luminance (Y) signal in order to protect a color (C) signal, it is necessary to provide the contour compensator at the succeeding stage to an Y/C separator. This restricts the circuit design.

Further, the conventional picture quality adjusting circuit requires the contour compensator and noise canceling circuit be arranged separately, thus enlarging the overall circuit be configuration.

SUMMARY OF THE INVENTION

Accordingly, it is an object of this invention to provide a picture quality adjusting circuit with a compact circuit configuration.

It is another object of this invention to provide a picture quality adjusting circuit for executing an accurate picture quality adjustment.

It is a further object of this invention to provide a picture quality adjusting circuit which is substantially relieved of restriction on circuit design.

According to one aspect of this invention, there is provided a circuit for adjusting a picture quality by processing a video signal, which circuit comprises:

Filter means for receiving said video signal and extracting a high-frequency component therefrom;

first waveform-shaping means for wave-shaping said high-frequency component extracted by said filter means to provide a noise cancel signal for cancelling the noise;

second waveform-shaping means for wave-shaping said high-frequency component extracted by said filter means to provide a contour compensation signal for compensating a contour of a picture; and adder means for adding said video signal, said noise cancel signal from said first waveform-shaping means, and said contour compensation signal from said second waveform-shaping means to provide a signal with adjusted picture quality.

BRIEF DESCRIPTION OF THE DRAWINGS

The foregoing aspects and other features of the invention will be explained in the following description in conjunction with the accompanying drawings wherein:

FIG. 1 is a circuit diagram illustrating the configuration of a picture quality adjusting circuit according to one embodiment of this invention;

FIG. 6 is a diagram illustrating a specific configuration of the circuit shown in FIG. 1.

DETAILED DESCRIPTION OF THE PREFERRED EMBODIMENTS

FIG. 1 illustrates one preferred embodiment of this invention.

Figure 2A:
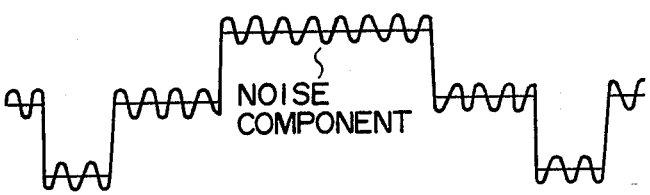
FIGS. 2A through 2E are diagrams illustrating signal waveforms in individual sections of the circuit shown in FIG. 1.

An input terminal 21 is supplied with a video signal of an NTSC system which is quantized as a digital video signal, as shown in FIG. 2A. As should be obvious from this diagram, the video signal includes a noise component as a high-frequency component. The video signal is supplied to an FIR filter 22 for extraction of the high-frequency component as well as to a delay circuit 23. This delay circuit 23 serves to match the timings at which the quantized video signal is added with a contour compensation signal and a noise canceling signal (the latter two signals will be described later).

Figure 2B:
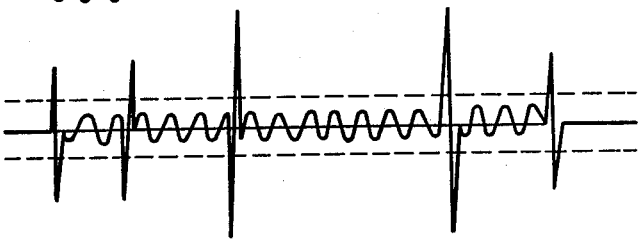

FIG. 2B illustrates the output waveform from the FIR filter whose configuration will be described in detail below. It should be noted from the diagram that the output of the FIR filter 22 includes an inverted noise component and a secondary differential waveform component. The latter waveform component is used to emphasize the contour of a picture. The output of the FIR filter 22 is supplied to a limiter 24 as well as to a slicer 26. The outputs of the limiter 24 and slicer 26 are respectively supplied to multipliers 25 and 27, serving as amplifiers, for gain adjustment of these outputs. The gain adjustment may be externally executed by means of variable resistors 30 and 31, etc.

Figure 2C:
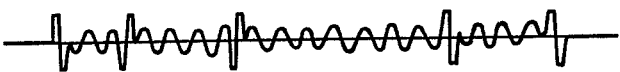
Figure 2D:
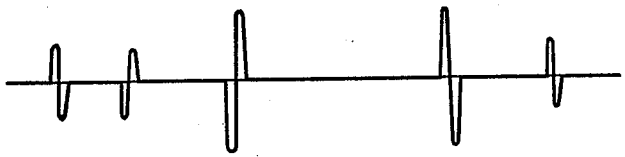
Figure 2E:
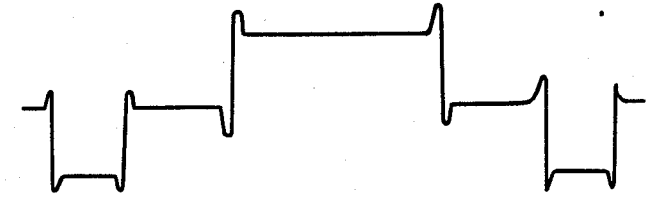

The limiter 24 limits the output of the FIR filter 22 with a predetermined limit level and outputs a signal with a waveform as shown in FIG. 2C. This output signal is considered as a noise component and is used as a noise canceling signal. The slicer 26 slices the output of the FIR filter 22 with a predetermined slice level and outputs a signal with a waveform as shown in FIG. 2D. This waveform is a secondary differential waveform and is used as a contour compensation signal. Those outputs of the limiter 24 and slicer 26 are supplied to an adder 28 where they are added with the quantized video signal (FIG. 2A) delayed by the delay circuit 23. The adder 28 provides a signal (see FIG. 2E) which has been subjected to contour compensation and does not contain the noise component. The output signal of the adder 28 is supplied to an output terminal 29.

Figure 3:
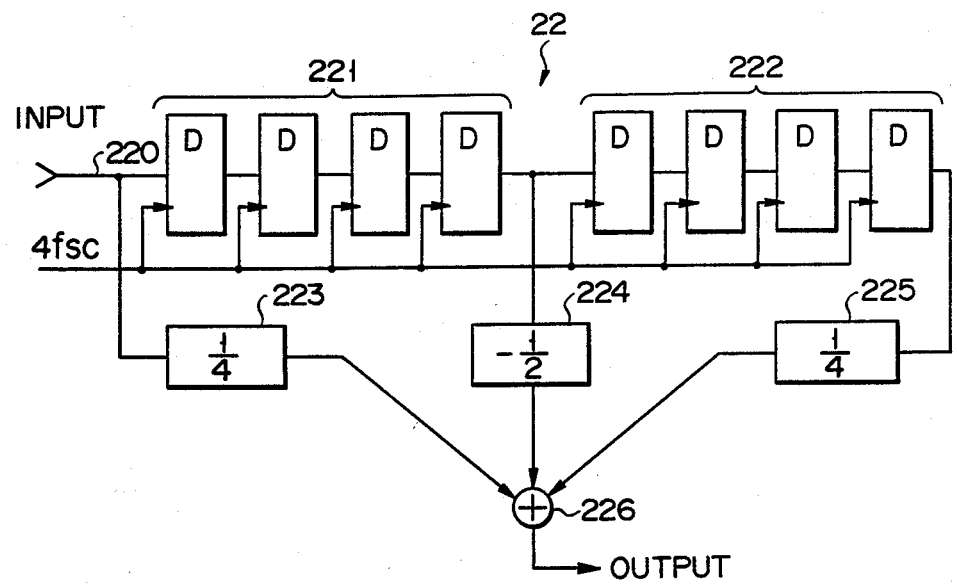
FIG. 3 is a diagram illustrating the circuit configuration of an FIR filter shown in FIG. 1.

FIG. 3 exemplifies the circuit configuration of the FIR filter 22. The quantized video signal supplied to an input terminal 220 is supplied to a delay section 221 which is constituted by a plurality of series-coupled delay elements. The output of the delay section 221 is supplied to another delay section 222 having the same structure as the former delay section 221. The signal at the input terminal 220, the output signal of the delay section 221 and the output signal of the delay section 222 are respectively supplied to coefficient multipliers 223, 224 and 225 for their gain adjustments. The adjusted signals are then supplied to, and added in, an adder 226. Accordingly, the output signal of the adder 226 has a waveform as shown in FIG. 2B. The individual delay elements of the delay sections 221 and 222 are driven by a clock pulse of 4 fsc (fsc: frequency of a color subcarrier signal).

Figure 4:
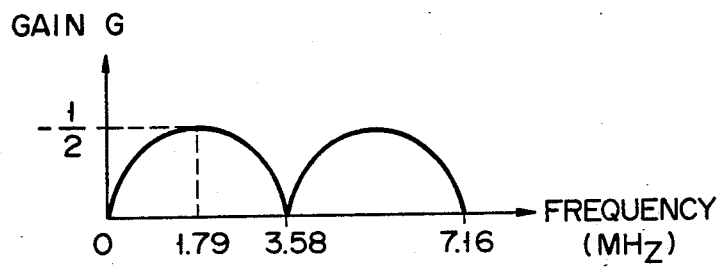
FIG. 4 is a diagram illustrating the frequency characteristic of the filter shown in FIG. 3.

As shown in FIG. 4, the frequency characteristic of the FIR filter 22 has a notching characteristic at 3.58 MHz, the frequency band of a chromatic signal. Accordingly, the gain for this particular frequency is reduced, so that no chromatic signal component is output from the FIR filter 22. It should be understood from FIG. 4, however, that a signal component having a frequency around 1 to 2 MHz is output from the FIR filter 22.

According to this invention, therefore, the effective utilization of the characteristic of the FIR filter 22 provides a secondary differential waveform having no ringing and thus provides an accurate contour compensation signal. Since the present circuit is constituted by a digital circuit, it is not sensible to a change in temperature and is therefore capable of providing a stable compensation signal. Due to the rich notching characteristic of the FIR filter 22, unlike in the case of the prior art, the location of the filter 22 is not restricted to the succeeding stage to an Y/C separating section. This gives the circuit design a greater flexibility.

The signal component associated with the contour compensation is a frequency component human beings can visually sense. If this frequency component should include a noise component, therefore, it would certainly affect the quality of a picture. According to this invention, the use of the FIR filter 22 not only can realize the contour compensation but can also eliminate a noise component.

In addition, according to this invention, the FIR filter can be shared as a single circuit by both of the noise canceling circuit and contour compensator, which require the respective, separate preceding circuits according to the prior art.

Figures 5A, 5B:
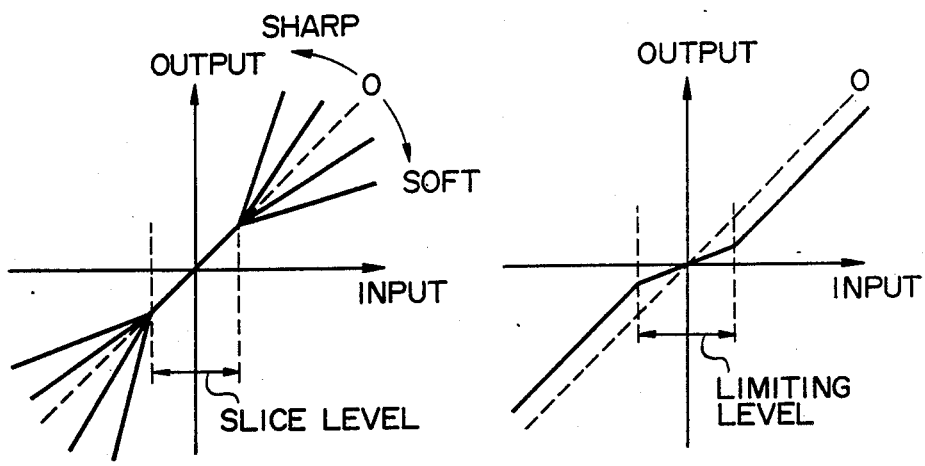
FIGS. 5A through 5C are diagrams illustrating how gains for contour compensation and noise canceling are changed by an external adjustment.

FIG. 5A illustrates how the level of the output of the slicer 26 for contour compensation is controlled by externally adjusting the gain of the amplifier 27. FIG. 5B similarly illustrates how the level of the output of the limiter 24 for noise canceling is controlled by externally adjusting the gain of the amplifier 25.

Figure 5C:
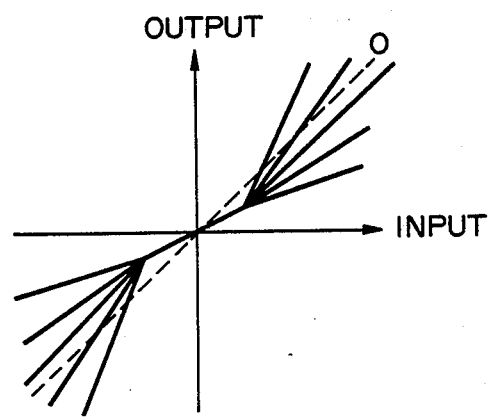

Referring to FIG. 5A, the ratio of the level of the input to that of the output is kept at 1:1 in a slice level range, i.e., a small-input region. For the region outside this slice level range, the gain of the amplifier 27 is externally adjusted by means of a variable resistor 31 or the like. In other words, the greater the gain, the sharper the contour of a picture to be emphasized. Conversely, the smaller the gain, the softer the picture contour to be emphasized. It should be noted from FIG. 5B that the gain is reduced to remove the noise component in a limiting level range, but the ratio of the level of the input to that of the output is kept at 1:1 for the other region. Accordingly, a general characteristic as shown in FIG. 5C can be attained.

FIG. 6 exemplifies a more specific configuration of the circuit shown in FIG. 1; the same reference numerals as used in the latter diagram are used in the former to specify the identical or corresponding elements.

The limiter 24 has a limiting level generator 241 and a comparator 242, which compares the limiting level from the generator 241 with the level of the output of the FIR filter 22 (see FIG. 2B). When the output of the FIR filter 22 is smaller than the limiting level, this output itself is selected by a switch 243. When the output of the FIR filter 22 is greater than the limiting level, on the other hand, the limiting level is selected. The signal with the selected level is amplified by the amplifier 25 serving as a multiplier and is then supplied as a noise canceling signal to an adder 281.

The slicer 26 includes a slice level generator 261 and a comparator 262, which compares the slice level from the generator 261 with the level of the output of the FIR filter 22. When the output of the FIR filter 22 is greater than the slice level, this output itself is selected by switch 263 and is then supplied to a subtracter 264. When the output of the FIR filter 22 is smaller than the slice level, the latter is selected. The slice level is subtracted from the signal with the selected level in the subtracter 264 to thereby provide a contour compensation signal. This compensation signal is added with the noise canceling signal in the adder 281. The resultant signal is supplied to the adder 28 where it is added with the quantized video signal supplied through the delay circuit 23 from the FIR filter 22.

Although the FIR filter is used in the above embodiment, an analog filter may be employed as well to produce sufficient contour-compensating and noise-eliminating effects.

According to this invention, as described above, the use of an FIR filter realizes contour compensation and noise elimination with a single circuit, thus making the overall circuit configuration more compact. Further, the use of the FIR filter can substantially eliminate generation of a ringing so that an accurate contour compensation signal can be acquired. Furthermore, unlike in the case of the prior art, the location of the contour compensator is not restricted to the succeeding stage to an Y/C separator, which is advantageous in designing the circuit. In addition, because of the use of a digital circuit, the present picture quality adjusting circuit is not affected by a temperature change and is therefore highly reliable.

What is claimed is:

1. A circuit for adjusting a picture quality by processing a video signal, said video signal including a noise, comprising:

filter means for receiving said video signal and extracting a high-frequency component therefrom;

first waveform-shaping means for wave-shaping said high-frequency component extracted by said filter means to provide a noise cancel signal for canceling the noise;

second waveform-shaping means for wave-shaping said high-frequency component extracted by said filter means to provide a contour compensation signal for compensating a contour of a picture; and adder means for adding said video signal, said noise cancel signal from said first waveform-shaping means and said contour compensation signal from said second waveform-shaping means to provide a signal with adjusted picture quality.

2. The circuit according to claim 1, further comprising amplifier means for amplifying said noise cancel signal.

3. The circuit according to claim 1, further comprising amplifier means for amplifying said contour compensation signal.

4. The circuit according to claim 1, further comprising amplifier means for amplifying said noise cancel signal and variable resistor means for externally adjusting a gain of said amplifier means.

5. The circuit according to claim 1, further comprising amplifier means for amplifying said contour compensation signal and variable resistor means for externally adjusting a gain of said amplifier means.

6. The circuit according to claim 1, wherein said video signal is a digital signal, and said filter means includes a finite impulse, response filter for processing the digital signal, said finite impulse response filter including a plurality of series-coupled delay elements, a plurality of coefficient multipliers, and an adder.

7. The circuit according to claim 1, wherein said first waveform-shaping means includes a limiter for limiting said high-frequency component with a predetermined level.

8. The circuit according to claim 1, wherein said first waveform-shaping means includes a limiter for limiting said high-frequency component with a predetermined level, said limiter having a comparator for comparing said high-frequency component with said predetermined level.

9. The circuit according to claim 1, wherein said second waveform-shaping means includes a slicer for slicing said high-frequency component with a predetermined level.

10. The circuit according to claim 1, wherein said second waveform-shaping means includes a slicer for slicing said high-frequency component with a predetermined level, said slicer having a comparator for comparing said high-frequency component with said predetermined level.

* * * * *